United States Patent

[11] 3,560,793

[72] Inventor Michel Payen
Vincennes, France
[21] Appl. No. 815,009
[22] Filed Apr. 10, 1969
[45] Patented Feb. 2, 1971
[73] Assignee Societe Orega Electronique & Mecanique
a corporation of France
Continuation of application Ser. No. 647,564, June 20, 1967, now abandoned.

[54] COLOR TELEVISION CONVERGENCE SYSTEM
11 Claims, 17 Drawing Figs.

[52] U.S. Cl. .......... 315/13
[51] Int. Cl. .......... H01j 29/50
[50] Field of Search .......... 315/13C

[56] References Cited
UNITED STATES PATENTS

| | | | |
|---|---|---|---|
| 2,880,366 | 3/1959 | Armstrong et al. | 315/13(C)X |
| 2,903,622 | 9/1959 | Schopp | 315/13(C)X |
| 3,163,797 | 12/1964 | Singleback | (315/13C) |

*Primary Examiner*—Rodney D. Bennett, Jr.
*Assistant Examiner*—Malcolm F. Hubler
*Attorney*—Kurt Kelman

ABSTRACT: The convergence correction device for three-gun tubes according to the invention is of the type comprising, for corrections at line and field period, for each red or green gun, a single magnetic circuit around which are wound coils carrying currents which generate the magnetic correction fields, these currents being of line and field frequencies. It is essentially characterized in that each of the windings corresponding respectively to red and to green is divided into a first and a second element: the first red and green elements receive in parallel a correction current whose purpose is to bring the two points of impact corresponding to the same signal on the same vertical line on the screen. The second red and green elements are coupled so as to generate two fields of the same amplitude but of opposite sign to bring these two points on the same horizontal line on the screen.

INVENTOR
MICHEL PAYEN
By Kastelman
AGENT

INVENTOR
MICHEL PAYEN
By [signature]
AGENT

INVENTOR
MICHEL PAYEN
By [signature]
AGENT

COLOR TELEVISION CONVERGENCE SYSTEM

This is a continuation application of application Ser. No. 647,564 filed Jun. 20, 1967, now abandoned.

It is known that color television display tubes generally contain a screen with three phosphor patterns, one with green fluorescence, one with red fluorescence and one with blue fluorescence, and three electron guns directed respectively on these three patterns.

The three corresponding beams must not diverge one from the other and simultaneously scan the same points of the screen, to ensure that a correct picture is obtained by superposition or convergence of the three color pictures.

Static convergence in the middle of the screen, i.e. in the absence of signals applied to the three guns, is easily obtained. But it is difficult to retain this convergence, as each line is being scanned (horizontal scan) and as each successive line is scanned (vertical scan). To obtain this convergence, use is made of magnetic correction devices, which receive line and field frequency signals. Such devices are generally complicated, costly and difficult to adjust.

The object of the present invention is a simple circuit of low cost, by means of which this convergence is secured during line and field scanning.

According to the present invention, there is provided a convergence correction device for a color television tube, having two side guns and a tricolor screen, said device comprising:

- a first and a second magnetic circuit respectively associated with said two guns, two corresponding first winding systems respectively associated with said first and second magnetic circuits; a each of said first winding systems comprising a first and a second coil;
- first means for applying to said first coils of said two corresponding first winding systems, a first signal at the line frequency for creating therein substantially parabolic currents of equal amplitude;
- second means for applying to aid second coils of said two corresponding first winding systems a second signal at the line frequency for creating therein substantially sawtooth-shaped currents of equal amplitude;
- said means for applying said signals being so designed that the magnetic fields created by the two coils of each one of the two corresponding winding systems are in the same direction for one of said systems and in opposite directions for the other one of said systems.

The invention will be better understood by means of the following description with reference to the appended drawings among which:

FIGS. 7—17 show modes of realization of convergence coils and of the associated circuits according to the invention.

Figure 1:
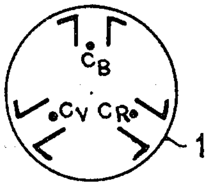
FIG. 1 is an end view of a conventional color television three-gun tube with its three cathodes.

FIG. 1 shows the rear part of cap 1 of a three-gun television tube. The three cathodes $C_R$, $C_V$ and $C_B$ are placed at the three apices of an equilateral triangle. On the paths of the corresponding beams, three pairs of magnetic pole pieces are respectively located, to apply to these beams, three correction magnetic fields, directed normally to said pole pieces so that the corresponding corrections are effected on the screen, along three directions at 120° to each other.

Cathode $C_B$ (blue cathode) and the tube axis form a vertical plane. It is generally easy, though outside the scope of the invention, to ensure correct convergence of the blue impact point with the other two impact points, on account of that privileged position with respect to the vertical and horizontal scan axes.

Figure 2:
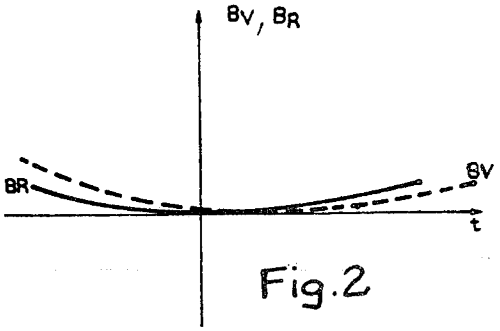
FIG. 2 shows the aspect of the uncorrected scan lines supplied by the red and green guns.

FIG. 2 shows how, with the convergence of the red and green beams established on the center of the screen, the screen is scanned by the two beams. Scanning is no longer rectilinear but curved: at the left of the middle of the line, red $B_R$ passes below green $B_V$, while the opposite is the case at the right. This phenomenon can be explained by the fact that the axes of the red and green beams are offset with respect to the screen axes.

Figure 3:
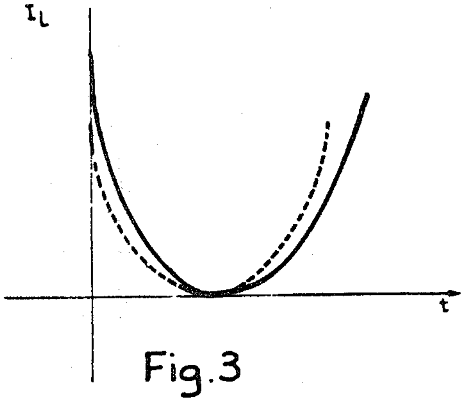
FIG. 3 shows the aspect of the conventional correction currents used for the obtention of convergence.

For correct scanning, it is sufficient, as usually done, to pass, at each scan, through convergence correction coils designed for this purpose, the currents shown in FIG. 3, so that the defect shown in FIG. 1 is compensated. Such a correction is difficult to obtain, for adjustments are not independent, and appropriate correction at the end of the line and at the top of the screen may destroy the convergence previously obtained in the middle of the screen.

According to the invention, relatively simple circuits are proposed for securing such adjustments, the corrections being effected as in known art along directions determined by the orientation of the deviating pole pieces.

Figure 4:
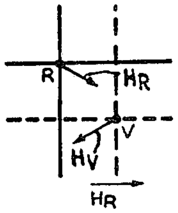
FIGS. 4, 5 and 6 are diagrams explaining the invention.
Figure 5:
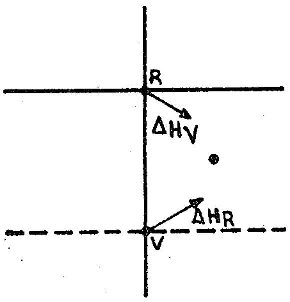
Figure 6:
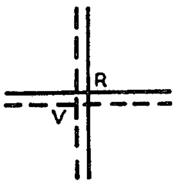

The basic concept will be understood on examining FIGS. 4, 5 and 6, the two green and red points of impact resulting from the same picture signal, assuming for example, that they belong to the horizontal line passing through the center of the screen.

In FIG. 4, two convergence fields of the same strength and providing corrections directed as shown, $\vec{H}_R$ and $\vec{H}_V$, generated by two first magnetic systems corresponding to green and red bring the two points R and V on the same vertical. It has to be noted that these two fields can be generated by the same parabolic current which is nil when the beams pass through the center of the screen.

Then, FIG. 5, the two points are brought to the same horizontal by a variation of the correction $\overrightarrow{\Delta H_R}$, and a variation $\overrightarrow{\Delta H_V}$, these two corrections being equal in absolute value, $\overrightarrow{\Delta H_R}$ having the same direction as $\vec{H}_R$ and $\overrightarrow{\Delta H_V}$ the opposite direction to $\vec{H}_V$. The result can be shown FIG. 6.

These two fields are generated by two further systems.

The next FIGS. show examples of realization of the invention for securing this result.

Figure 7:
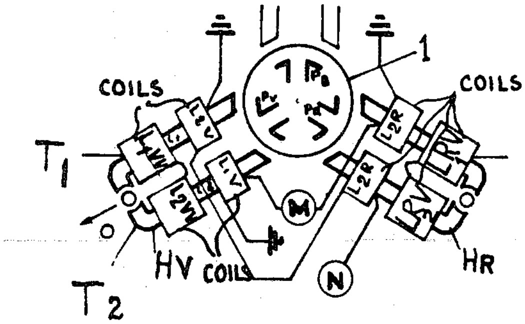
Figure 8:
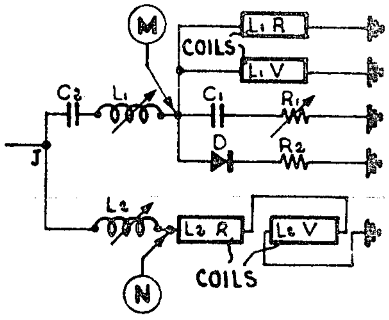

FIG. 7 and FIG. 8 show respectively a first mode of assembly of line frequency correction coils for color television tubes, and the associated circuit which is the object of the invention.

FIG. 7 shows tube 1 once more. Two identical magnetic circuits $H_R$ and $H_V$ are respectively concerned with convergence corrections to be applied to the red and the green beams.

In the $H_V$ circuit, outside the tube and with the axis set in a direction 120° to the vertical, are two ferrite L-shaped parts, for example $T_1$ and $T_2$, separated by an airgap in which is placed a rotating round magnet, of which one end 0 is seen, which is magnetized in a diametral direction. These circuits close on two pole pieces $P_R$ and $P_V$ inside the tube. In the absence of a signal, rotation of the magnet permits adjusting the static convergence on the center of the screen. Around the circuits $T_2$ and $T_1$, are wound respectively the coils $L_1V$ and $L_2V$ which, according to the invention, provide convergence corrections at line frequency and the coils LVV for frame frequency convergence corrections which will be considered further on.

The circuit $H_R$ is identical and comprises coils $L_1R$, $L_2R$, $L_{RV}$.

In the following, reference will be made only to the circuits associated with the line convergence coils.

One example of this circuit is shown in FIG. 8.

A line frequency pulsed signal is applied to point J. The coils $L_1R$ and $L_1V$ are connected in parallel between ground and a point M.

Point M is connected to point J by an adjustable inductance $L_1$ and a capacitor $C_2$. Further, point M is connected to ground by a capacitor $C_1$ and an adjustable resistance $R_1$ in series, and also, in parallel with $R_1$ and $C_1$, by a diode D which conducts from M to ground, and a resistance $R_2$ in series.

This first part of the circuit provides the function shown in FIG. 4.

Figure 9:
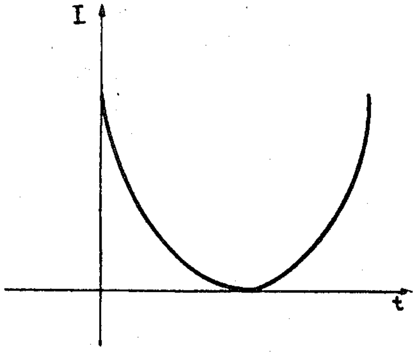

$L_1R$ and $L_1V$ carry the same parabolic current shown in FIG. 9, supplied by means of 2R $1C_1R_1$ and held at zero, when the beam scans the center of line, by diode D and resistance $R_2$. The current flowing through coils $L_1R$ and $L_1V$, supplies, by virtue of the orientation of the magnetic circuits, the fields $\vec{H}_r$ and $\vec{H}_R$ causing the corrections shown in FIG. 4. 19L These two fields form an angle of 120°.

These two fields are nil when the beams are set on the center of the screen and increase as they depart from that point.

Figure 10:
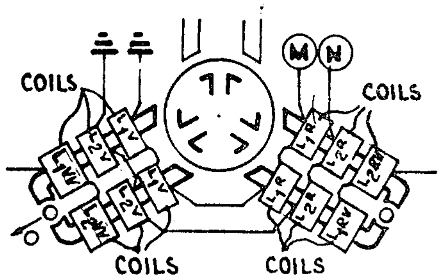
Figure 11:
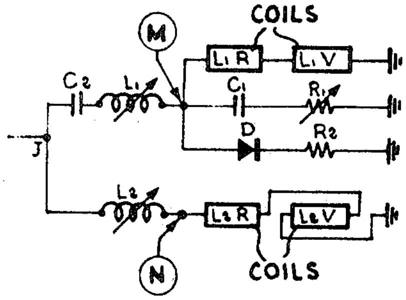

The second part of the circuit comprises, connected also between J and ground, the two coils L2R and $L_2V$ in series and producing fields of opposite signs, and an adjustable inductance $L_2$; this inductance integrates the voltage at point J and generates a sawtooth current in the coil system. This current is at line frequency. Its value is zero when the beams pass throgh the center of the screen. FIG. 10 shows the arrangement of the coils $L_1R$, $L_1V$ and $L_2R$, $L_2V$ around the three-gun television tube, this corresponding to the circuit of FIG. 11.

In FIG. 11 to 15 the same references refer to the same part. The circuits of FIGS. 11, 13 and 15 differ from the above circuits of FIG. 8 by different wiring of the various convergence coils. Coils $L_1R$ and $L_1V$ still carry the same parabolic current.

Coils $L_2R$ still supply equal and opposite fields varying in sawtooth fashion, these variations occuring at line frequency.

Figure 12:
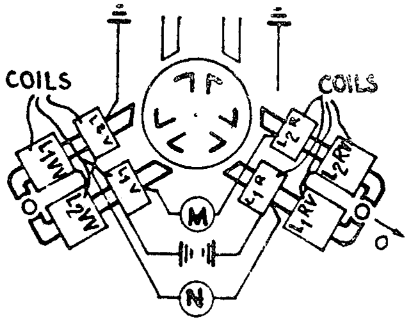
Figure 13:
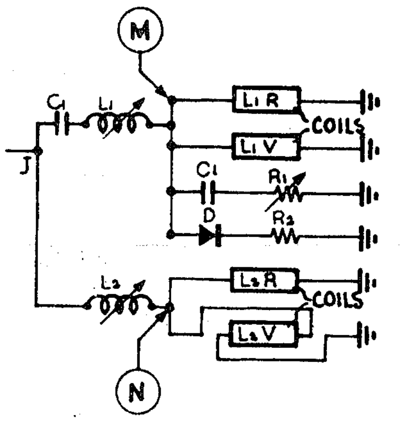
Figure 14:
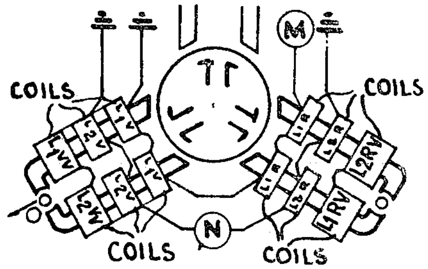
Figure 15:
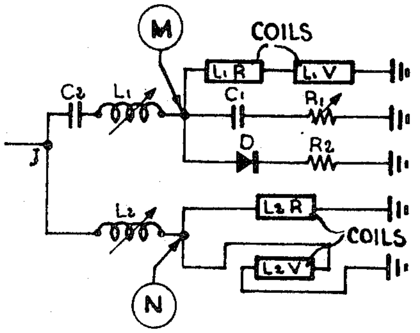

FIGS. 12 and 14 show respectively how the coils of FIGS. 13 and 15 are mounted around the television tube.

The next circuits provide field frequency corrections. They are based on the same principle but, on account of the lower frequency (50 c./s.) of the field signal, the coils act as pure resistances.

Figure 16:
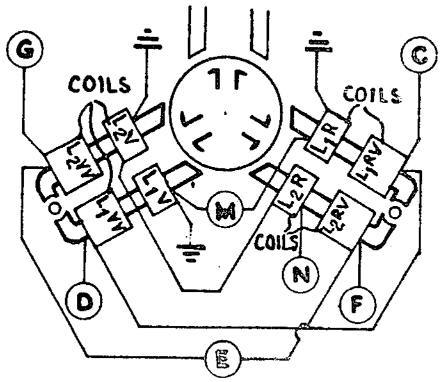

In FIG. 16 the convergence coils $L_1VV$, $L_2VV$, $L_1RV$, $L_2RV$, are mounted as shown around the same magnetic circuits.

Figure 17:
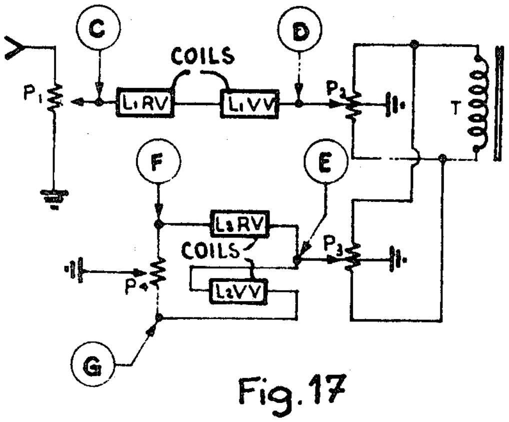

In FIG. 17 $L_1RV$ and $L_1VV$ are connected in series between the movable contact C of a first potentiometer $P_1$ which receives a parabolic voltage at field frequency and the movable contact D of a potentiometer $P_2$ whose center point is grounded, and connected to transformer T which supplies the frame scan.

Potentiometer $P_2$ supplies at D the scanning sawtooth voltage. The combination of voltages at C and D produces in $L_1RV$ and $L_1VV$ a parabolic current similar to that of FIG. 9, which, through this combination, is kept at zero when the beam passes through the center of the screen.

Coils $L_2RV$ and $L_2VV$ are connected in parallel, but are wound in opposition between slider E of potentiometer $P_3$ connected in parallel with potentiometer $P_2$ and ground through a balancing potentiometer $P_4$.

These two coils thus carry two sawtooth currents which produce fields substantially equal, in opposition and adjustable.

Of course the invention is not limited to the embodiments described and shown which were given solely by way of example.

I claim:

1. A convergence correction device for a color television tube, having two side guns and a tricolor screen, said device comprising:

a first and a second magnetic circuit respectively associated with said two guns, two corresponding first winding systems respectively associated with said first and second magnetic circuits; each of said first winding systems comprising a first and a second coil;

first means for applying to said first coils of said two corresponding first winding systems, a first signal at the line frequency for creating therein substantially parabolic currents of equal amplitude and second means for applying to said second coils of said two corresponding first winding systems, a second signal at the line frequency for creating therein substantially sawtooth-shaped currents of equal amplitude; and said first coils of said first winding systems and said second coils of said first winding systems being respectively so interconnected that the magnetic fields created by the two coils of one of said first winding systems, are in the same direction, and the magnetic fields created by the two coils of the other first winding system are in opposite direction.

2. A device as claimed in claim 1 further comprising two corresponding second winding systems respectively associated with said first and second magnetic circuits, each of said second winding systems comprising a first and a second coil; third means being provided for applying to said first coils of said two corresponding second winding systems a first signal at the field frequency for creating therein substantially parabolic currents of equal amplitude; fourth means being provided for applying to said second coils of said two corresponding second winding systems a second signal at the field frequency for creating therein substantially sawtooth-shaped currents of equal amplitude; said first coils of said second winding systems and said second coils of said second winding systems being respectively so interconnected, that magnetic field created by the two coils of one of said second winding systems are in the same direction and the magnetic fields created by the two coils of the other of said second winding systems are in the opposite direction.

3. A device as claimed in claim 1, wherein said first means comprise: a first terminal, a second terminal and a third terminal; means for feeding to said third terminal a pulsed signal at the line frequency; means for connecting said first coils of said first winding systems, to said first terminal and said second terminal; a first capacitor and a first inductance being series connected between said second and third terminals; a second capacitor and a first resistor being connected between said second and said first terminal; a third resistance and a diode connected in series between said first and said second terminal, said diode conducting from said second terminal to said first terminal.

4. A device as claimed in claim 3, wherein said first coils of said first winding systems are parallel connected between said first terminal and said second terminal.

5. A device as claimed in claim 3, wherein said first coils of said first winding systems are series connected between said first terminal and said second terminal.

6. A device as claimed in claim 1, wherein said second means comprise a variable inductance, having a first terminal to which a pulsed line frequency signal is applied, and a second terminal, means being provided for connecting said second coils of said first winding systems to the ground and to said second terminal.

7. A device as claimed in claim 6, wherein said second coils of said first winding systems are series connected, between the ground and said other terminal.

8. A device as claimed in claim 6, wherein said second coils of said first winding systems are parallely connected between the ground and said other terminal.

9. A device as claimed in claim 2, wherein said third means comprise: a first potentiometer having a first terminal grounded, a second terminal for receiving a parabolic voltage at said field frequency, and a movable tap; a second potentiometer having two terminals and a movable tap; a transformer having a secondary, having two terminals respectively connected to said second potentiometer terminals: means for feeding to said transformer a sawtooth-shaped voltage at said field frequency: said first coils of said second winding systems being series connected between the movable taps of said first and second potentiometer.

10. A device as claimed in claim 9, wherein said fourth means comprise a third potentiometer having a movable tap and two terminals respectively connected to said transformer secondary terminals; a fourth potentiometer having two terminals, and a movable tap grounded, means being provided for connecting in series said second coils of said second winding systems to said two terminals of said fourth potentiometer, and a lead between said second coils being connected to said movable tap of said third potentiometer.

11. A device as claimed in claim 1, wherein each of said magnetic circuits comprises two L-shaped arms, an airgap between said arms and a cylindrical magnet in said airgap, and means for adjusting the angular position of said magnet.

PO-1050
(5/69)

UNITED STATES PATENT OFFICE
CERTIFICATE OF CORRECTION

Patent No. 3,560,793 Dated Feb. 2, 1971

Inventor(s) Michel Payen

It is certified that error appears in the above-identified patent and that said Letters Patent are hereby corrected as shown below:

Page 1, after item (73) insert:--
(32) Priority June 23, 1966
(33) France
(31) No. 66,631

Signed and sealed this 18th day of May 1971.

(SEAL)
Attest:

EDWARD M.FLETCHER,JR.
Attesting Officer

WILLIAM E. SCHUYLER,
Commissioner of Patent